United States Patent
Melli et al.

(10) Patent No.: US 6,738,783 B2
(45) Date of Patent: May 18, 2004

(54) DYNAMICALLY CONFIGURABLE GENERIC CONTAINER

(75) Inventors: Bruno P Melli, Ft Collins, CO (US); Richard A. Ferreri, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 421 days.

(21) Appl. No.: 09/779,968

(22) Filed: Feb. 9, 2001

(65) Prior Publication Data

US 2002/0111699 A1 Aug. 15, 2002

(51) Int. Cl.[7] .................................................. G06F 7/00
(52) U.S. Cl. .................... 707/103 R; 707/100; 707/102
(58) Field of Search ......................... 707/103 R, 100, 707/102; 717/100; 709/223, 310, 203, 219; 345/734

(56) References Cited

U.S. PATENT DOCUMENTS

| | | | | |
|---|---|---|---|---|
| 5,805,796 A | * | 9/1998 | Finch et al. | 714/40 |
| 6,208,994 B1 | * | 3/2001 | Abdelnur | 707/103 R |
| 6,272,537 B1 | * | 8/2001 | Kekic et al. | 709/223 |
| 6,301,582 B1 | * | 10/2001 | Johnson et al. | 707/103 R |
| 6,356,913 B1 | * | 3/2002 | Chu et al. | 707/103 R |
| 6,370,508 B2 | * | 4/2002 | Beck et al. | 705/1 |
| 6,560,609 B1 | * | 5/2003 | Frey et al. | 707/103 R |
| 6,567,818 B1 | * | 5/2003 | Frey et al. | 707/103 R |
| 2002/0129345 A1 | * | 9/2002 | Tilden et al. | 717/162 |

* cited by examiner

*Primary Examiner*—Charles Rones
*Assistant Examiner*—Neveen Abel-Jalil

(57) ABSTRACT

A method and system create and use a generic container as a data structure used in a software program. A selected data structure may be specified at start-up time or run-time using a mapping table that tracks the specified data structures for each generic container used by the program. Existing data structures are abstracted to a generic interface for use with the container. The program interacts with the generic container using the generic interface, which allows the container to add, delete, and look up data stored in the container and to retrieve a key used by the container. A program uses an object factory to create an instance of a generic container having the generic interface. At run-time, the object factory refers to the mapping table to determine which specific data structure is used for each generic container.

20 Claims, 6 Drawing Sheets

DYNAMICALLY CONFIGURABLE GENERIC CONTAINER

FIELD OF INVENTION

The present invention relates generally to computer software. More particularly, it relates to data storage structures.

BACKGROUND

In the field of software programming, various types of data structures may be used by software applications depending upon the application's needs. Examples of commonly used data structures include hash tables, lists, sets, queues, arrays, trees, and more exotic data structures, such as black, red, etc. Every data structure has advantages and disadvantages. Some data structures are good for storing data, but not for retrieving data. For example, a data structure that stores data more efficiently than other types might require greater than average time to retrieve data. The opposite of the space versus time relationship might be true for other data structures. For example a data structure that provides quick retrieval access might require greater than average memory storage space.

Under existing methods and systems, a programmer using data structures must select a particular type of data structure during programming. For example in C++ language, an array data structure might be selected by the command, "Array myarray=newArray( . . . );". A disadvantage of existing methods is that the data structure must be selected on the "front end" of the design, during programming. If it is later determined that the data structure is not optimum for the data used at run-time, it is necessary to rewrite and recompile the software using a different data structure.

A more flexible method of selecting a data structure is to use an object factory to delay the choice of data structure and to make it somewhat easier to change the data structure at a later time. For example, container data structures are common in the standard C++ template library. The programmer asks the object factory for a particular data structure. The array selection example in C++ language might involve the commands, "ObjectFactory *ofp=. . . ; Array myArray= ofp ->createArray ( . . . );". For example, instead of creating an array directly, a programmer could call an object factory createArray method instead. This way, if the programmer later decides to change the implementation of the array, the only place where the code needs to be changed is in the object factory createArray method and the array implementation itself. The programmer does not have to go back and change every single call that creates a new array. This solution is still limited because the program has to be recompiled to take advantage of the new array implementation. The solution is also limited because the programmer still expects to deal with an array and is so limited to the interface an array provides. What is needed is a method and system for more efficiently changing the type of data structure to optimize the structure to the application.

SUMMARY OF INVENTION

A method and system are disclosed for creating and using a generic container as a data structure used in a software program. The data structure may be specified at start-up time or run-time. If the nature of the data changes from one run to another, the data structure may be adapted to a specific set of data. Existing data structures are abstracted to a generic interface for use with the container. The program interacts with the generic container using the generic interface, which allows the container to add, delete, and look up data stored in the container and to retrieve a key used by the container. A program uses an object factory to create an instance of a generic container having the generic interface. A mapping table, or other data structure, is maintained to map a container creation call to the appropriate container. At run-time, the object factory refers to the mapping table to determine what type of data structure to create. For a very simple program that only uses one data structure the mapping table would contain only one entry. For a more complex program that has several subsystems, each one with its own specific storage requirements, the mapping table could have a different entry for each subsystem. The specified data structures may be changed by changing the entries in the mapping table.

DETAILED DESCRIPTION

Figure 1:
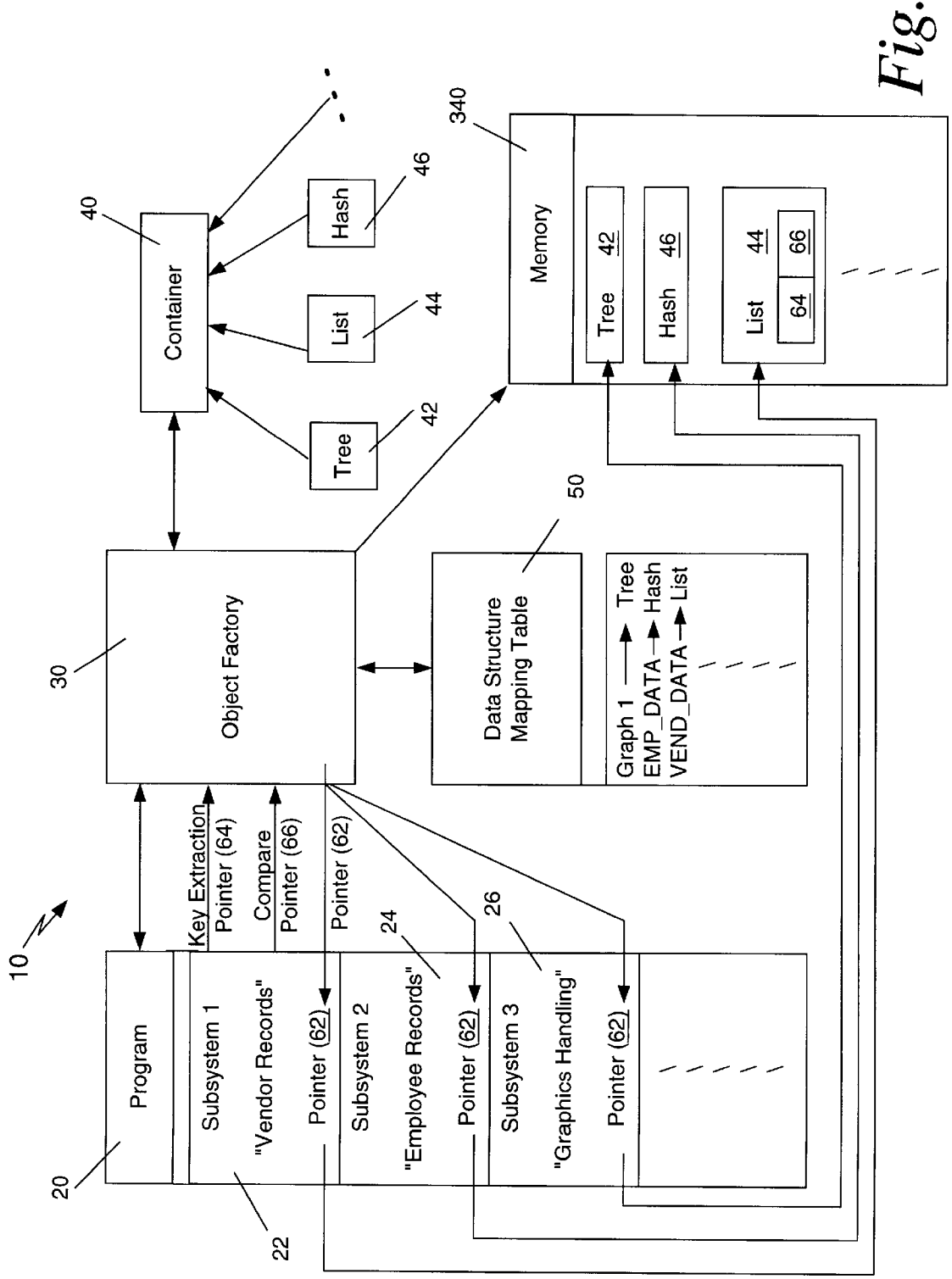
FIG. 1 shows a block diagram of the system.

FIG. 1 shows a block diagram of the system 10. The system 10 discloses a method for programming using a generic container 40 as a data structure. After programming, different storage data structures can be reconfigured before program execution without changing the program code. The program requests a dynamic storage data structure 40 from the object factory 30. A mapping table 50, or other structure, is used by the object factory 30 to decide what particular container type to return to the program 20.

A software program 20 may have a plurality of subsystems 22, 24, 26 that use data structures to process data. A simple program 20 might use no subsystems, for example, if it uses only one data structure, or if all of the data structures are of the same type. In the example shown in FIG. 1, the first subsystem 22 may represent "vendor records," the second subsystem 24 may represent "employee records," and the third subsystem 26 may represent "graphics handling." A program 20 with multiple subsystems 22, 24, 26 may use different types of data structures for each subsystem. In the example system 10 shown in FIG. 1, the vendor records subsystem 22 uses a list data structure 44, the employee records subsystem 24 uses a tree type data structure 42, while a "graphics handling" subsystem 26 uses a hash table data structure 46.

The system 10 requests generic containers 40 to be used to store data. At run-time specific containers 42, 44, 46 are created in a memory 340 depending on the configuration of the mapping table 50. The program subsystem 22, 24, 26 requests a generic container 40 from the object factory 30. The object factory 30 creates the container 42, 44, 46 in memory 340 and passes a container address pointer 62 to the subsystem 22, 24, 26. The pointer 62 references the location in memory 340 where the data structure 42, 44, 46 is stored. The code of the subsystem 22, 24, 26 interacts with the pointer 62. All specific containers share the same interface so the program does not have to change to use one or the other specific container 42, 44, 46. Each specific container 42, 44, 46 has distinct storage properties that makes it more or less attractive for particular applications. To create a generic container interface, the interfaces of various existing data structures are abstracted to create a common interface to be used by the system. In one embodiment, each existing data structure 42, 44, 46 provides the following interface:

Add(ContainerData, ContainerKey)
Get(ContainerKeyData)
Remove(ContainerKeyData)
GetKey(ContainerKeyData).

The Add command adds an entry to the container 40. The Get command looks up an entry in the container 40. The Remove command removes an entry from the container 40. The GetKey command extracts or computes a key for given data.

Container type data structures may be defined to derive from a common base class, referred to as "container," which has the common interface. Subclasses redefine the interface implementation to suit the specific type of data storage implemented. For example, a list 44 might append a new data element to the end of its existing elements. A hash table 46 might instead extract the key from the object to be stored, and position the object according to the key. The overall programming scheme is neutral relative to the specific class level of the data structure implemented. The application 20 looks for a generic data container 30 having the proper interface. So long as a particular data structure, or class implementation, is interfaced it may be integrated into the generic container system 10.

A startup file, for example a mapping table 50, is maintained to store properties of the data storage classes and the corresponding program subsystems that use those data storage types. When the object factory 30 is created it reads the startup file 50 to initialize mapping between subsystems 22, 24, 26 and corresponding data structures 42, 44, 46 to be used. FIG. 1 shows a data structure mapping table 50 having entries for various subsystems 22, 24, 26. When it receives a request for a new container 40, the object factory 30 accesses the mapping table 50 to determine what type of specific data structure 42, 44, 46 to create and return to the requesting subsystem 22, 24, 26. In the example of FIG. 1, the mapping table 50 shows that the graphics handling subsystem 26 uses a tree structure as shown by the entry "GRAPH1 ->tree." The employee records subsystem 24 uses data stored as a hash table as shown by the entry "EMP$_{13}$DATA ->hash." The vendor records subsystem 22 uses a list data structure as shown by the entry "VEND$_{13}$DATA ->list." In a complicated program 20 with multiple subsystems 22, 24, 26, the mapping table 50 will have multiple entries. At start-up a subsystem's data structure may be changed by changing the entry in the data storage mapping table 50.

In one implementation, the generic container system 10 may be used to test program performance to determine the optimal data structure for a program 20. The generic container 40 allows efficient testing of container subclasses 42, 44, 46 by interchanging entries in the mapping table 50. A loop routine may be used to test different data structures 42, 44, 46 by plugging these data structures 42, 44, 46 into the mapping table 50 and then performing, for example, addition, deletion and lookup functions. Timing of the loops gives an indication of how appropriately a data structure 42, 44, 46 functions.

In another implementation, the generic container system 10 may be used to reconfigure a program 20 to more efficiently process data. Sometimes a system 10 will perform generally well, but encounter a particular set of data that causes the performance to degrade. If the problem data set is identified, different data structures may be tested in place of the existing structure to identify a more appropriate structure.

In one embodiment, the subsystem 22, 24, 26 also uses functions for extracting a key from a data structure 42, 44, 46 and for comparing entries in a data structure 42, 44, 46. The subsystem 22, 24, 26 passes to the object factory 30 a pointer 64 to the key extraction function and a pointer 66 to the compare function. The object factory 30 in turn passes these pointers 64, 66 to the specific data structure 42, 44, 46 stored in memory 340.

Figure 2:
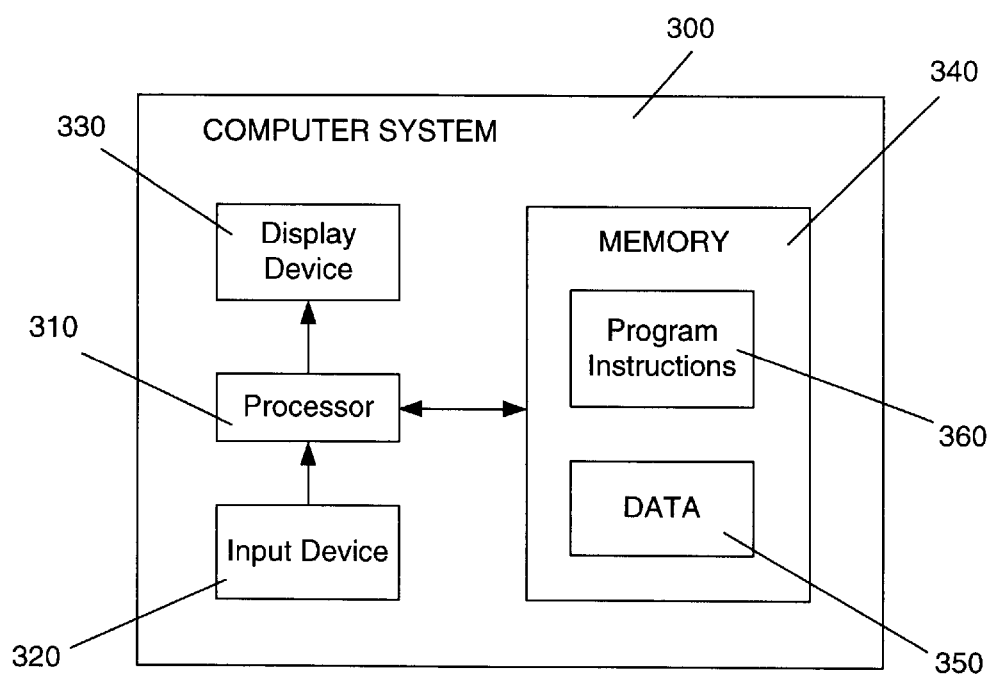
FIG. 2 shows a block diagram of a computer system that may use the generic container.

FIG. 2 shows a computer system 300 having a processor 310 connected to an input device 320 and a display device 330. The processor 310 accesses memory 340 in the computer system 300 that stores the data 350. Program software 360 is also stored in the memory 340. Memory 340 may include random access memory (RAM) or similar types of memory, and it may store one or more applications for execution by the processor 310. Memory 340 may also include a hard disk drive, floppy disk drive, CD-ROM drive, or other types of non-volatile data storage. The input device 320 may include any type of device for entering information into the computer system 300, such as a keyboard, key pad, cursor-control device, touch-screen, or microphone. The display device 330 may include any type of device for presenting visual information such as, for example, a computer monitor, a flat-screen display, or display panel.

In use, the input device 320 receives commands instructing the processor 310 to call the software 360 to retrieve or process data 350. The results of the data processing may be displayed on the display device 330. A user may change the container type specification by entering commands into the input device 320 and may then cause the processor 310 to execute the program instructions 360 on the data 350 to evaluate the performance of different types of data structures.

Figure 3:
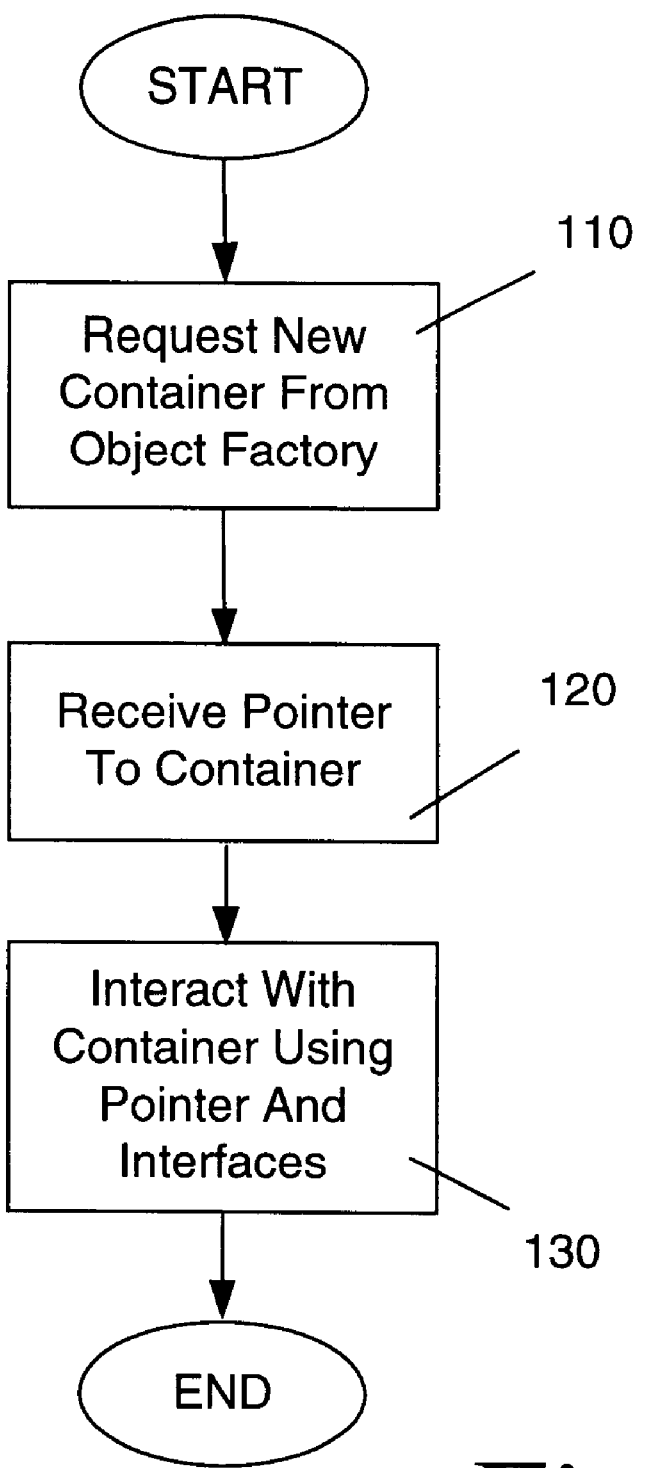
FIG. 3 shows a flow chart of the method used by a program to create a container.

FIG. 3 shows a flow chart of the programming method for creating a generic container data structure 40. The method may be implemented in, for example, software modules in program instructions 360 for execution by the processor 310. A subsystem 22, 24, 26 of the program 20 requests 110 a new container from an object factory 30, or other container creation device. The subsystem 22, 24, 26 receives 120 from the object factory 30 a pointer to a container 40 location in memory 340. The subsystem 22, 24, 26 then interacts 130 with the container 40 to manipulate data by sending commands using the interfaces to the pointer.

Figure 4:
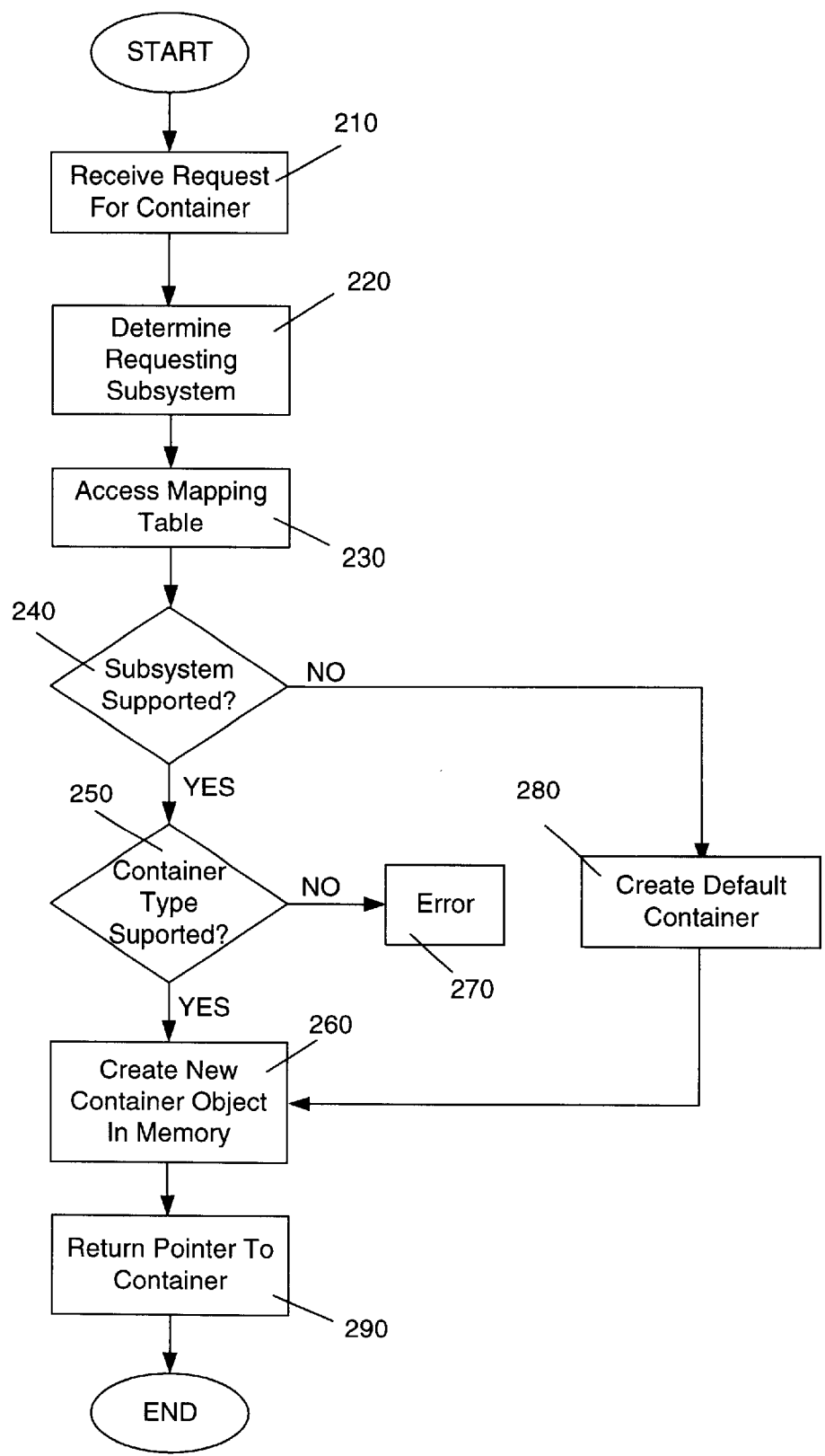
FIG. 4 shows a flow chart of the method used to create a container.

FIG. 4 shows a flow chart of the method for creating a generic container 40 using, for example, an object factory 30. The method may be implemented in, for example, software modules in program instructions 360 for execution by the processor 310. A container creator, such as an object factory 30, receives 210 a request for a container 40 from the program 20. The object factory 30 determines 220 which subsystem 22, 24, 26 of the program 20 is requesting the container 40. The object factory 30 then accesses 230 the mapping table 50 to identify the type of container 40 specified for the subsystem 22, 24, 26. The object factory 30 determines 240 whether the subsystem 22, 24, 26 in the mapping table is supported—that is, whether it has a container preference 42, 44, 46 specified. If it is not supported, then, in one embodiment, the object factory 30 creates 280 a default type of container 40. In another embodiment, the object factory 30 might simply return an error or prompt a user for an input. If the subsystem is supported, then the object factory 30 then determines 250 whether the container type specified in the mapping table 50 is supported—that is, whether it is known by the object factory 30. If the container type is not supported, an error is issued 270. Otherwise, a new specific container 42, 44, or 46 is created 260 in a memory 340. The object factory 30 then returns 290 to the subsystem 22, 24, 26 of the program 20 a memory address pointer 62 to the location in memory 340 where the container 40 has been created. The program 20 can then interact with the container 40 by sending interfaced commands to the pointer.

In one embodiment, the object factory 30 also implements two optional arguments for a compare function and a key extract function used by the subsystem 22, 24, 26. Pointers 64, 66 to these functions are passed from the subsystem 22, 24, 26 to the object factory 30. The object factory 30 in turn passes the pointers 64, 66 to the specific data structure 42, 44, 46 created in memory 340.

The container 40 stores data without regard to the type of data stored. The pointers are used to process the data. As noted, different data structures 42, 44, 46 use different means to perform basic functions of insert, delete, and look-up. Some data structures use a "key" to identify the location of data. For example, an array uses a key as an index to the array, such that data inserted or retrieved from a key, n, refers to data stored in the nth position in the array. A linked list 44 may simply insert or delete elements from the front or the back of the list 44, in which case no key value is needed. A hash table 46 may allow data to be stored in any location, using the key value to locate and retrieve the data. Also, with a hash table 46, the key is dependent upon the type of data stored. For an employee record, the key might be the employee name or social security number. For an integrated circuit (IC) design, such as a very large scale integration (VLSI) design, the key value might be a circuit block name.

To create a common interface for different container types 42, 44, 46, a key extraction pointer 64 and a compare function pointer 66 may be used. The compare pointer 66 allows the system 10, through an input device 320 and display device 330, to search through data to determine whether a particular data entry already exists. For example, the compare function pointer 66 considers two pieces of data and determines whether they are equal, and if they are not equal, which one is larger. This function can be used to test for the presence of a particular data in a container 40, or may be used to sort data.

The key extraction pointer 64 allows the system to identify a particular entry by searching through the data structure based on the key. For example, given a piece of data, the key extraction function extracts the key for that data. The container 40 may then use the key to store data to the container 40, or might test whether data with the same key has already been stored.

Figure 5:
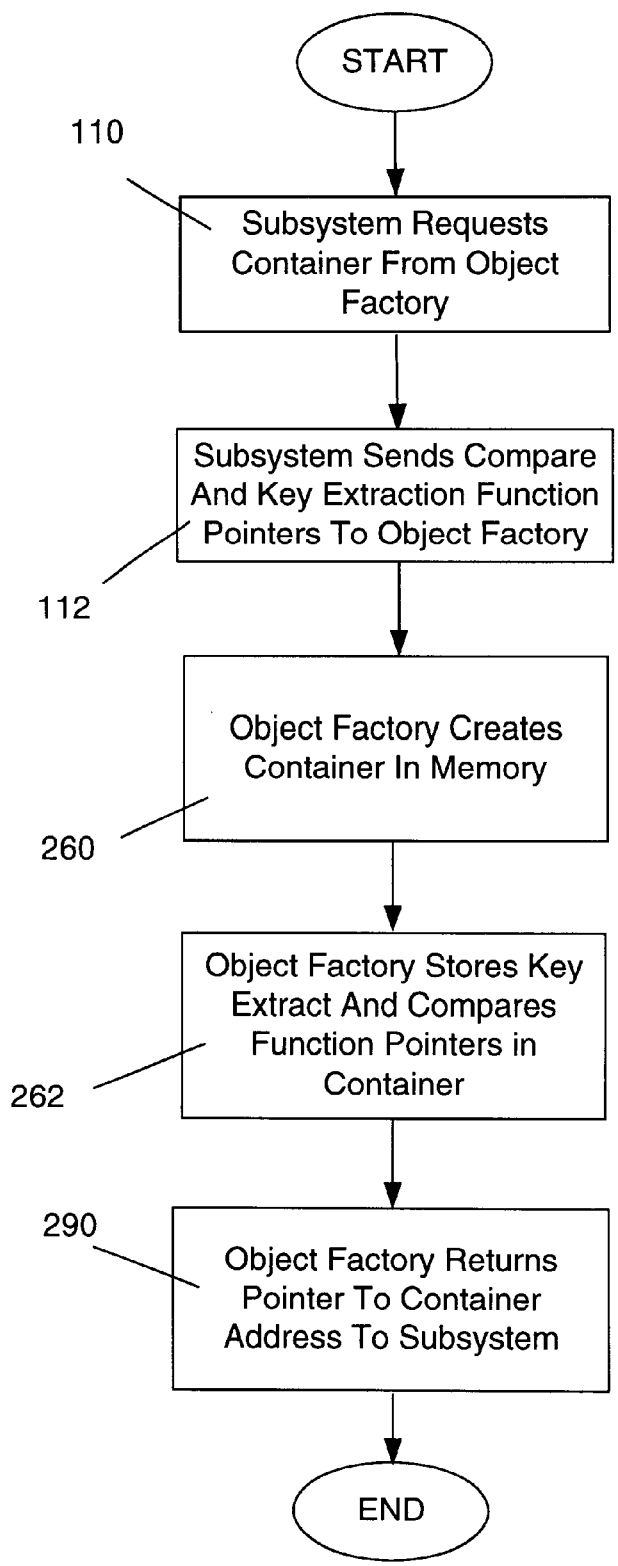
FIG. 5 shows a flow chart of the use of the key extraction and compare function pointers.

FIG. 5 shows a flow chart of the use of the key extraction and compare function pointers 64, 66. In execution of the program 20, the subsystem 22, 24, 26 calls the object factory 30 and requests 110 a container 40. At this time, the subsystem 22, 24, 26 knows which particular data structure 42, 44, 46 is assigned to it and knows generally what the data is. The object factory 30 and the container 40 do not necessarily know the type of data being processed. As part of its request 110 for the container 40, the subsystem 22, 24, 26 also sends 112 to the object factory 30 pointers 64, 66 to the key extract and compare functions. The request 110 may be separate from the sending 112 of the pointers 64, 66, or the pointers 64, 66 may be part of the argument requesting 110 the container 40. The object factory 30 creates 260 a specific container 42, 44, 46 in memory 340. The object factory 30 also stores 262 the key extraction and compare function pointers 64, 66 to the memory 340 in the container 42, 44, 46. In one embodiment, the creation 260 of the container 42, 44, 46 may be a separate step from the storing 262 of the pointers 64, 66. In another embodiment, these may be combined into one step 260, 262. The object factory 30 returns 290 to the subsystem 22, 24, 26 an address pointer 62 to the memory location of the container 42, 44, 46.

Figure 6:
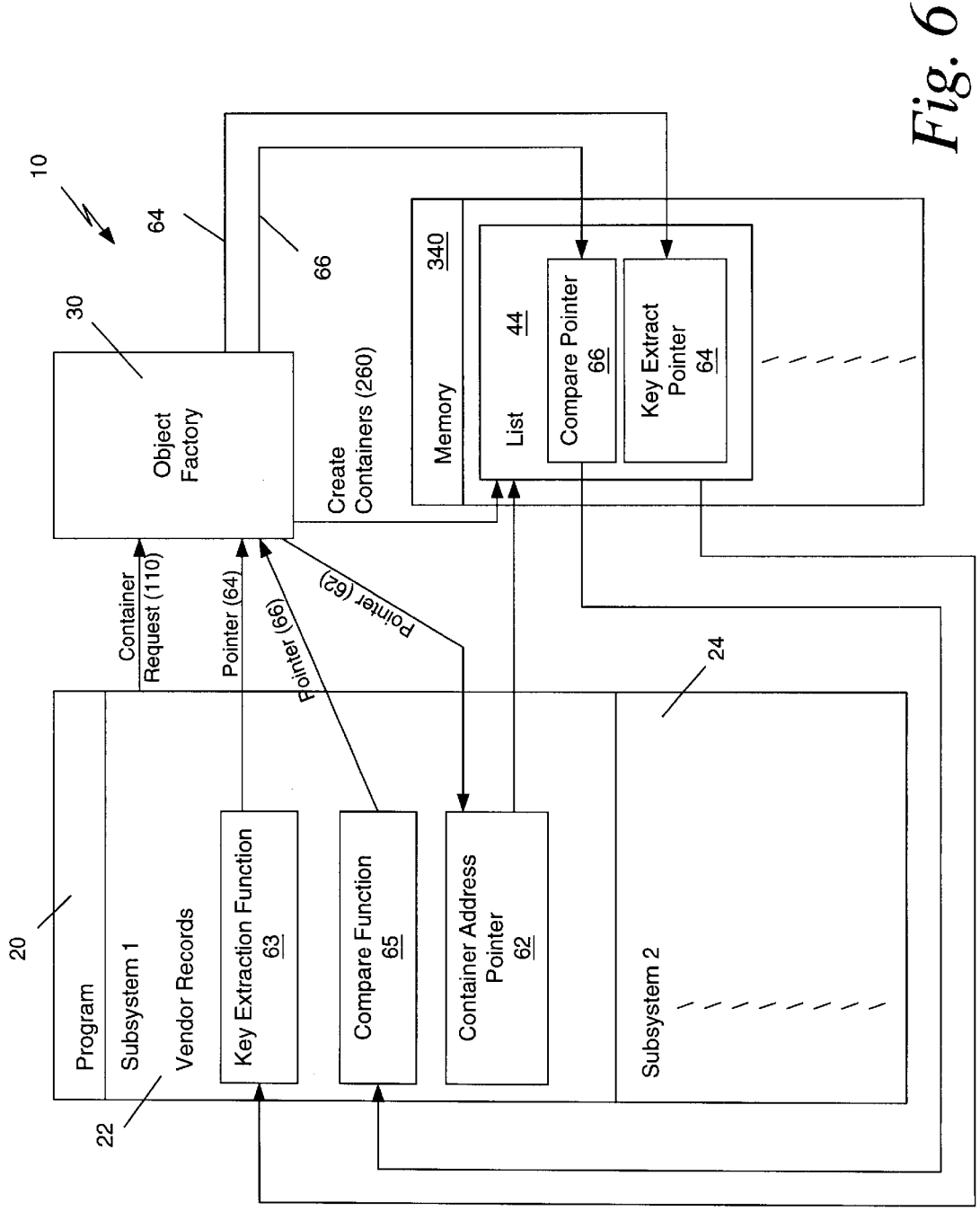
FIG. 6 shows a block diagram of the system using the key extraction and compare function pointers.

FIG. 6 shows a block diagram of part of the system 10 shown in FIG. 1. In the embodiment of FIG. 6, the first subsystem 22 of the program 20 is shown having a key extraction function 63 and a compare function 65. In another embodiment, the functions 63, 65 may be separate from the program 20, stored in, for example, a library (not shown). The subsystem 22 requests 110 a container 40 from the object factory 30. The subsystem 22 also sends to the object factory 30 references, such as memory address pointers 64, 66, to the key extraction function 63 and the compare function 65. The object factory 30 creates 260 a specific container 44 in memory 340. In this case, a list 44 is created 260 because that is the structure specified for subsystem 1 in the mapping table 50, or other reference data structure. The object factory 30 also passes the key extract and compare function pointers 64, 66 to the list 44 created in memory 340 so that the list 44 will have access to those functions during processing. Upon creating the list 44, the object factory 30 sends to the subsystem 22 a reference, such as an address pointer 62, to the memory location of the list 44.

In use, different containers 42, 44, 46 may use the key extraction and compare function pointers 64, 66 differently. For example, if a container 40 is a hash table 46 and it receives a request to store data, it will call the "key extraction" function 63 for the data to be stored, and will then store the data to the correct location using the key. If the container 40 is a sorted list 44, it would call the compare function 65 to compare the new data with data already stored until it identified the proper location in the list 44 to store the data. The program 20 does not require different coding for different data structures 42, 44, 46. Instead, it uses the generic interface to manipulate the data, for example, to store new data. The specific container 42, 44, 46 then uses the compare and key extraction function pointers 64, 66 to process the request.

A pointer is stored to a data element, and during processing the system 10 may need to determine whether a particular element is already stored. The compare function 65 directs the pointer through the data to determine whether a data element is already stored. For example, if the data is stored in the employee record subsystem 24, the data to be stored may be a name and social security number in one structure. The object factory 30 may get a call 110 to create a new container 40 to keep track of all employees. As part of the creation call 110, the object factory 30 might also receive pointers 64, 66 to two functions for handling the employee structure. Given a pointer to an employee structure, the "extract key" function 63 will know how to retrieve the social security number. Given pointers to two employee records, the "compare" function 65 will know how to extract the names from each record and compare these two names.

As part of the creation process, the object factory 40 will pass the function pointers 64, 66 to the container creation means, such as an object factory 30. That creation means 30 will store these two pointers in the newly created instance of the container 44. That container 44 then has access to these two functions when needed.

Although the present invention has been described with respect to particular embodiments thereof, variations are possible. The present invention may be embodied in specific forms without departing from the essential spirit or attributes thereof. For example, some embodiments shown herein store information in a mapping table 50. One skilled in the art will recognize the various data structures may be used for this purpose. Also, some embodiments describe the container being created using an object factory 30 and refer to object-oriented programming techniques. One skilled in the art will recognize that various methods may be used to create the generic container 40 and that the method is not confined to object-oriented programming.

In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). It is desired that the embodiments described herein be considered in all respects illustrative and not restrictive and that reference be made to the appended claims and their equivalents for determining the scope of the invention.

We claim:

1. A method of processing data using generic container data structures, the method comprising:

creating a generic container for storing data for a subsystem of a program, the generic container having a data structure that is defined after the container is created and before an application program is executed;

passing a container address pointer to the subsystem, the container address pointer referencing a location in memory where the data structure is stored; and abstracting different data structures to a generic interface, the generic interface facilitating interaction between the different data structures and the generic container, and the different data structures sharing the generic interface.

2. The method of claim 1, wherein the step of creating the generic container comprises sending a request to an object factory to create the container.

3. The method of claim 1, wherein the program comprises multiple subsystems.

4. The method of claim 1, further comprising creating an entry in a mapping table that correlates the specific data structure to the subsystem.

5. The method of claim 1, further comprising running the program using the data structure assigned to the subsystem.

6. The method of claim 1, further comprising sending from the subsystem to an object factory a compare function pointer for comparing data entries and a key extraction function pointer for extracting a key value from the container.

7. The method of claim 1, further comprising creating commands for adding data entries to the container, identifying data entries in the container, removing data entries from the container, and extracting a key from the container.

8. A computer readable medium having stored thereon a data structure comprising:

an object factory that creates a generic container for storing data, the generic container having a data structure that is defined after the container is created and before an application program is executed, the object factory passes a container address pointer to a subsystem of a program, the container address pointer referencing a location in memory where the data structure is stored; and a generic interface for processing the data according to specifications of different data structures, the different data structures being abstracted to a generic interface, the generic interface facilitating interaction between the different data structures and the generic container, and the different data structures sharing the generic interface, the generic interface comprising:

a first interface that adds data entries to the container;

a second interface that identifies data entries in the container; and a third interface that removes data entries from the container.

9. The medium of claim 8, wherein the generic interface further comprises a fourth interface that extracts a key from the container.

10. The medium of claim 8, wherein the container is used in a software program, and wherein the data structure is selected before a program is executed.

11. The medium of claim 10, wherein the container is created by the object factory for storing data used in the subsystem of the program.

12. The medium of claim 11, wherein the data structures are specified by an entry in a mapping table, which entry is read by the object factory before the program is executed.

13. The medium of claim 8, wherein the data structures are specified at run-time.

14. The medium of claim 8, wherein the container further comprises compare pointer for comparing data entries and a key extract pointer for extracting a key value from the container.

15. A set of application program interfaces embodied in a computer-readable medium for execution on a computer in conjunction with an application program that processes data using a generic container data structure, the interfaces comprising:

a first interface that adds data entries to a generic container created by an object factory, the generic container having a data structure that is defined after the container is created and before an application program is executed, and the generic container including a container address pointer that is passed to a subsystem of the application program to reference a location in memory where the data structure is stored;

a second interface that identifies data entries in the container; and a third interface that removes data entries from the container;

wherein different data structures are abstracted to a generic interface, wherein the generic interface facilitates interaction between the different data structures and the generic container, and wherein the different data structures share the generic interface.

16. The set of claim 15, wherein the interfaces further comprise a fourth interface that extracts a key from the container.

17. The set of claim 15, wherein the container is created by the object factory for storing data used in a the subsystem of the program.

18. The set of claim 17, wherein the program has more than one subsystem.

19. The set of claim 17, wherein the data structure is specified in a mapping table accessed by the object factory.

20. The set of claim 15, wherein the container further comprises compare pointer for comparing data entries and a key extract pointer for extracting a key value from the container.

* * * * *